Feb. 25, 1930.  R. C. NEWHOUSE  1,748,920
PROCESS OF AND APPARATUS FOR COMMINUTING MATERIAL
Filed Feb. 23, 1928
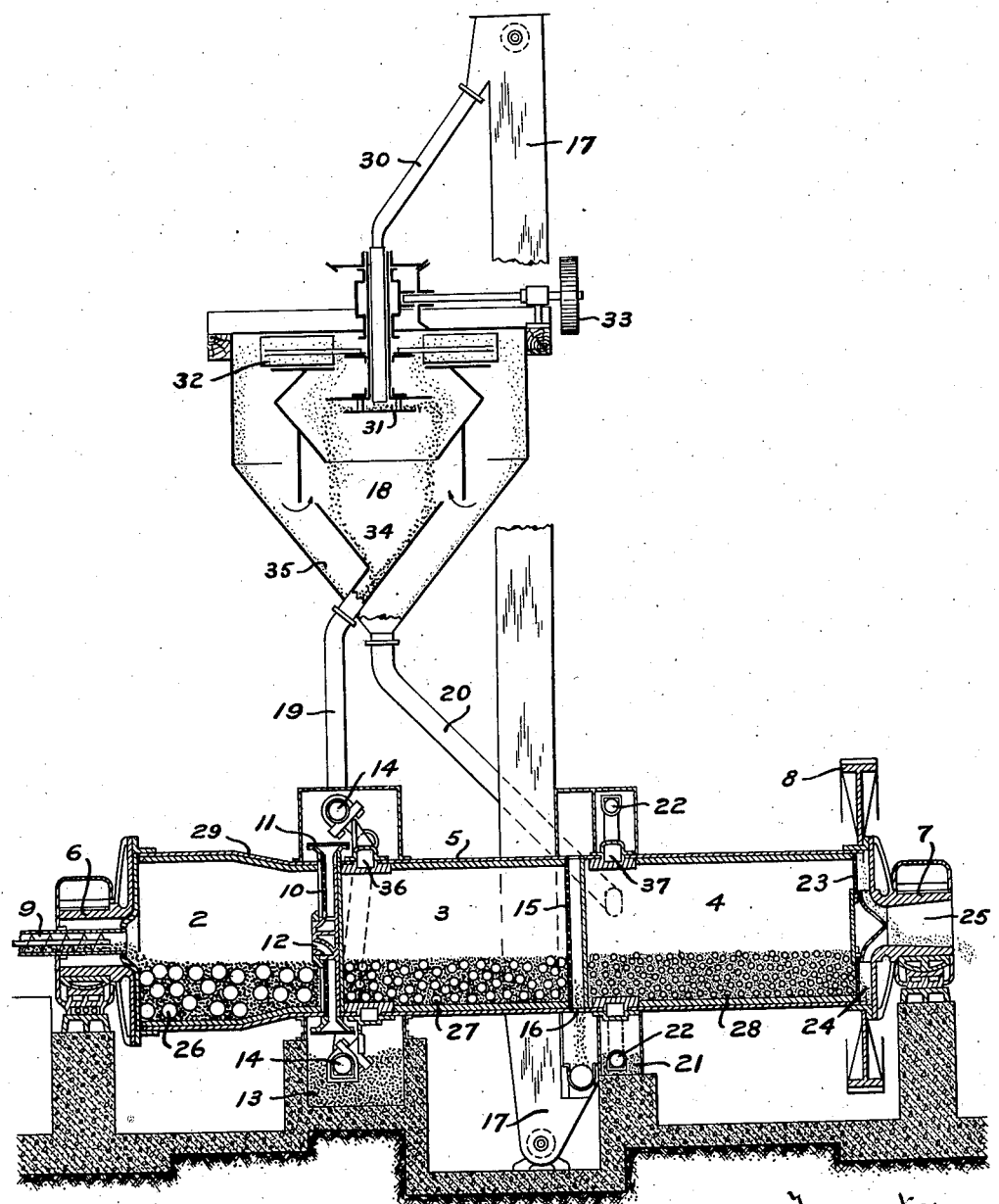
Inventor
R. C. Newhouse
by G. F. DElwin
Attorney Patented Feb. 25, 1930

1,748,920

UNITED STATES PATENT OFFICE

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

PROCESS OF AND APPARATUS FOR COMMINUTING MATERIAL

Application filed February 23, 1928. Serial No. 256,209.

The present invention relates to an improved process of and apparatus for comminuting granular material such as cement clinker or the like.

An object of the invention is to provide an improved process of reducing granular material to a fine powder. Another object of the invention is to provide simple and efficient apparatus for effecting commercial exploitation of the improved process.

It is ordinarily desirable in the production of high grade cement, to have the final product reduced to extremely fine condition. In an effort to so reduce the material, it has heretofore been common commercial practice to utilize an air separator to remove the fine material from that delivered at the discharge end of a tube mill, and to return the oversize or coarse material discharged by the air separator to one of the compartments of the mill for further reduction. The fine material thus removed by the air separator in accordance with the the prior methods, constituted the finished product. It has been found, however, that, while the air separator is perhaps the most effective type of dry separator for removing fine material from oversize, the most efficient use of this separator produces a material lacking a sufficient quantity of extremely fine powder, such as is required in high grade cement. It is also well known that the capacity of an air separator is greatly reduced where it is attempted to deliver a very fine product.

In order to insure production of extremely fine and thoroughly comminuted cement or the like, the present invention contemplates the provision of an improved method of reducing the cement forming material, wherein an air separator or similarly functioning classifying means is merely employed to prepare graded feed for the fine grinding comminuting compartment. With the present improvement, the material which is delivered from the air separator merely constitutes a feed for and is further reduced in a comminuting chamber provided with relatively small tumbling comminuting bodies which will most effectively reduce the fine product. The comminuting bodies employed in the fine grinding compartment in accordance with the present invention may be considerably smaller than have heretofore been considered practical, and effectively reduce the material to an extremely fine powder such as demanded by the trade. It is well known that relatively small comminuting bodies are most efficient for extremely fine grinding, but with the ungraded feed heretofore used, it has been necessary to employ comminuting bodies larger than would otherwise have been necessary, in order to pulverize the larger particles. In accordance with the present invention, the air separator is not used to prepare a finished product, but, on the contrary, to prepare a relatively granular material from which the coarser particles have been removed, and this relatively granular material is delivered to another compartment containing very small comminuting bodies, for final grinding. This also permits operation of the air separator at maximum capacity.

While the invention is especially applicable to the manufacture of cement by a dry process of comminuting, the features thereof are generally applicable to the reduction of other materials. Although the air separator is especially adapted to classify cement making materials when utilizing the dry process of grinding, other forms of classifiers utilizing a fluid for grading purposes may be effectively employed to attain the improved results herein referred to. The important feature of the invention is the provision of an effective classifier for separating the fine material from coarser material delivered from a comminuting chamber, and the subsequent further reduction of the fine material alone in a comminutor especially adapted to treat such fine material.

A clear conception of the several steps constituting the improved process and of one embodiment of apparatus for effecting commercial exploitation thereof, may be had by referring to the drawing accompanying and forming a part of this specification wherein the various parts have been designated by suitable reference characters.

The single figure of the drawing is a somewhat diagrammatic illustration of a multiple compartment tube mill having an air separator and material transporting devices associated therewith in a manner to permit the improved process to be carried on thereby.

Referring specifically to the drawing, the tube mill comprises in general an elongated drum or shell 5 rotatably supported by means of feed and discharge end trunnions 6, 7 and having therein partitions which divide the interior of the shell into successive comminuting chambers 2, 3, 4 having tumbling comminuting bodies 26, 27, 28 therein.

The initial or coarse grinding chamber 2 is of larger diameter than the others, and is provided with a tapered portion 29 at the discharge end thereof. The feed trunnion 6 at the inlet end of the chamber 2, is provided with a feeder 9 for introducing the material which is to be reduced. The material after being initially reduced in the chamber 2 by the large tumbling comminuting bodies 26, is delivered through a screen 10 constituting a part of the first partition, upon an annular screen 11 located externally of the shell 5. The oversize material which fails to pass through the screen 11, is returned to the coarse grinding chamber 2 by means of return scoops 12, while the separated fine material is delivered by gravity to a receptacle 13 located below the shell 5.

The material delivered to the receptacle 13 by the screen 11, is removed from this receptacle and is injected into the feed end of the intermediate comminuting compartment 3 by means of one or more external spiral scoops 14 secured to and rotatable with the shell 5. These scoops 14 receive the material at their outer extremities and during rotation of the mill advance the said material inwardly toward the mill axis, eventually discharging the material into the chamber 3 through injection nozzles 36. In the chamber 3 the material is subjected to the comminuting action of medium size tumbling comminuting bodies 27 and is eventually delivered in further reduced condition through an end discharge screen 15 constituting a part of the second partition, and subsequently through peripheral openings 16. The material thus delivered from the intermediate chamber 3 is discharged by gravity into a bucket elevator 17.

The elevator 17 raises the material delivered thereto and finally discharges the said material through a spout 30 to an air separator 18. The air separator 18 comprises an outer casing having a conical bottom 35 formed to receive the separated fine material and to deliver the same through a discharge spout 20 to a stationary receptacle 21 located below the inlet end of the fine grinding compartment 4. Centrally within the outer casing of the air separator, is located a hopper 34 which is adapted to receive the oversize material and to deliver the same through a spout 19 to the stationary receptacle 13, for further grinding in the intermediate compartment 3. The material delivered into the air separator through the spout 30 is deposited upon a rotary distributor 31 above which is located an air circulating fan 32, both the fan 32 and the rotor 31 being rotatable at relatively high speed by means of driving mechanism 33. As the entering material falls upon the lower disk of the rotor 31, it is thrown outwardly within the inner central casing of the air separator and the blast of air being circulated upwardly through the inner casing of the separator removes the fine material and causes the same to travel with the air current upwardly through the fan 32 and outwardly and downwardly along the inner surface of the outer casing. As the air delivered from the fan 32 travels downwardly along the outer casing, most of the entrained fine material is deposited by gravity and drops upon the conical bottom 35 from whence it is delivered to the stationary receptacle 21 as previously described.

The feed end of the fine grinding compartment or chamber 4 is provided with one or more peripheral spiral scoops 22 which remove the relatively fine graded material from within the receptacle 21 and, during rotation of the mill, inject the said graded material into the inlet end of the chamber 4 through injection nozzles 37. The tumbling comminuting bodies 28 within the chamber 4 are of relatively small size, sufficient, however, to effectively reduce the graded material admitted to this chamber to a fine powder. The finally comminuted material is eventually discharged from the chamber 4 through the end screen 23 into the path of radially disposed elevating vanes 24 which discharge the final product or powder through the opening 25 in the discharge trunnion 7. As illustrated in the drawing, continuous rotation may be imparted to the shell 5 by means of a driving gear 8 located at the discharge end of the mill.

It will thus be noted that during normal operation of the multiple compartment tube mill in conjunction with the air separator, the material after being preliminarily reduced is classified in the air separator, the graded relatively fine material delivered from the separator being the only material treated within the final comminuting chamber 4. Each of the several compartments 2, 3, 4 is provided with tumbling comminuting bodies which are adapted to effectively reduce the material delivered thereto. In view of the fact that the fine material removed by the air separator 18 need not be as fine as that previously required, the air separator may be operated at maximum capacity thereby insuring large production of extremely fine material at the discharge end of the apparatus. While the embodiment of the invention specifically illustrated employs an air separator, it will be apparent that any similarly functioning classifying means wherein the material is graded with the aid of a fluid, may be effectively employed. In any event, the classifier merely provides a feed for the fine grinding chamber and does not deliver finished product as in the prior methods.

It should be understood that it is not desired to limit the invention to the exact sequence of steps herein described, or to the precise details of construction of the apparatus disclosed, for various modifications within the scope of the claims may occur to persons skilled in the art.

It is claimed and desired to secure by Letters Patent:

1. The process of comminuting material in a multiple compartment tube mill, which comprises, preliminarily reducing the material in one compartment of the mill, delivering the preliminarily reduced material to another compartment of the mill for further reduction, pneumatically treating the further reduced material to separate the fine material from the oversize, returning said oversize material to a preceding compartment of the mill for further reduction, and further reducing said fine material in a subsequent compartment of the mill.

2. The process of comminuting material in a multiple compartment tube mill, which comprises, preliminarily reducing the material in one compartment of the mill, delivering the preliminarily reduced material to another compartment of the mill for further reduction, pneumatically treating the further reduced material to separate the fine material from the oversize, returning said oversize material to a preceding compartment of the mill for further reduction together with the preliminarily reduced material, and further reducing said fine material in a subsequent compartment of the mill.

3. The process of comminuting material in a multiple compartment tube mill, which comprises, preliminarily reducing the material in one compartment of the mill, delivering the preliminarily reduced material to a second compartment of the mill for further reduction, pneumatically treating the material discharged from said second compartment to separate the fine material from the oversize, returning said oversize material to the inlet end of said second compartment for further reduction, and further reducing said fine material in a third compartment of the mill.

4. The process of comminuting material in a multiple compartment tube mill, which comprises, preliminarily reducing the material in one compartment of the mill, delivering the preliminarily reduced material from the mill, returning at least some of the preliminarily reduced material to a second compartment of the mill for further reduction, delivering the further reduced material from the mill, pneumatically treating the further reduced material to separate the fine material from the oversize, returning the oversize material to said second compartment for further reduction together with preliminarily reduced material, and returning said fine material to a third compartment of the mill for further reduction.

5. In combination, a tube mill comprising a shell and partitions dividing said shell into a plurality of compartments, and an air separator formed to treat material discharged from an intermediate compartment of said mill to separate the fine material from the oversize, and means for returning the oversize material from said separator to said intermediate compartment and for returning said fine material to an end compartment of said mill for further reduction.

6. In combination, means forming a series of three compartments rotatable about an axis, the first of said compartments having relatively large and heavy freely tumbling comminuting bodies therein, the second of said compartments having smaller and lighter freely tumbling comminuting bodies therein, and the last of said compartments having still smaller and lighter freely tumbling comminuting bodies therein, means for feeding to said second compartment material which has been preliminarily reduced in said first compartment, a pneumatic classifier for separating the fines from the coarse material delivered from said second compartment, and means for delivering said fines alone to said third compartment for further reduction.

7. In combination, means forming a series of three compartments rotatable about an axis, the first of said compartments having relatively large and heavy freely tumbling comminuting bodies therein, the second of said compartments having smaller and lighter freely tumbling comminuting bodies therein, and the last of said compartments having still smaller and lighter freely tumbling comminuting bodies therein, means for feeding to said second compartment material which has been preliminarily reduced in said first compartment, a pneumatic classifier for separating the fines from the coarse material delivered from said second compartment, means for delivering said fines alone to said third compartment for further reduction, and means for returning the coarse material from said classifier to said second compartment for further reduction.

8. In combination, a shell rotatable about an axis and forming three successive compartments, the first of said compartments being of larger diameter than the others and having therein relatively large and heavy freely tumbling comminuting bodies, the second of said compartments having therein smaller and lighter freely tumbling comminuting bodies, and the last of said compartments having still smaller and lighter freely tumbling comminuting bodies therein, means for feeding to said second compartment material which has been preliminarily reduced in said first compartment, a pneumatic classifier for separating the fines from the coarse material delivered from said second compartment, means for returning the coarse material from said classifier to an initial compartment for further reduction, and means for delivering said fines alone to said third compartment for further reduction.

9. The process of comminuting material, which comprises, preliminarily reducing the material by subjecting the same to the impact and abrasive action of relatively large and heavy comminuting bodies, further reducing said material by subjecting the same to the action of smaller and lighter comminuting bodies, pneumatically separating the fine from the coarse product resulting from said further reduction, and finally reducing the separated fine material alone by subjecting the same to the action of still smaller and lighter comminuting bodies.

10. The process of comminuting material, which comprises, preliminarily reducing the material by subjecting the same to the impact and abrasive action of relatively large and heavy comminuting bodies, further reducing the said material by subjecting the same to the action of smaller and lighter comminuting bodies, pneumatically separating the fine from the coarse product resulting from said further reduction, returning the coarse product resulting from said pneumatic separation for further reduction by said previously mentioned comminuting bodies, and finally reducing the separated fine material alone by subjecting the same to the action of said still smaller and lighter comminuting bodies.

11. The process of comminuting material, which comprises, preliminarily reducing the material by subjecting the same to the impact and abrasive action of relatively large and heavy comminuting bodies, further reducing said material by subjecting the same to the action of smaller and lighter comminuting bodies, utilizing a fluid to separate the fine from the coarse product resulting from said further reduction, and finally reducing the separated fine material alone by subjecting the same to the action of still smaller and lighter comminuting bodies.

12. Apparatus for pulverizing material comprising, in combination, a mill having a rotary tube, compartments therein including preliminary, intermediate and finish grinding compartments, grinding elements in the compartments, means to transfer material from the preliminary compartment to the intermediate compartment, an air separator, means to conduct material from the intermediate compartment to the air separator, means to deliver tailings from the air separator to the intermediate compartment, and means to conduct fines from the separator to the finish grinding compartment.

13. Apparatus for pulverizing material comprising, in combination, a ball tube mill having a rotary tube with compartments therein including preliminary, intermediate and finish grinding compartments, ball charges in the compartments, an air separator, an elevator for receiving material from the intermediate compartment and for conducting the same to the air separator, a sump, means to conduct tailings from the air separator to the sump, scoop means on the tube for transferring material from the sump to the intermediate compartment, a sump adjacent the finish compartment, means to conduct fines from the air separator to the latter sump, and scoop means on the tube for transferring the fines from the fines receiving sump to the finish compartment, that they may be finally reduced therein.

14. Apparatus for pulverizing material comprising, in combination, a mill having a rotary tube, compartments therein including preliminary, intermediate and finish grinding compartments, grinding elements in the compartments, means to transfer material from the preliminary compartment to the intermediate compartment, an elevator having a hopper, means for discharging material from the intermediate compartment into the elevator hopper, an air separator for receiving material from the elevator and for separating the same into fines and tailings, and means to conduct the fines from the air separator to the finish compartment for final reduction therein.

15. Apparatus for pulverizing material comprising, in combination, a mill having a rotary tube, a plurality of compartments in the tube, grinding elements in the compartments, an air separator for receiving material from one of the compartments and for separating the same into fines and tailings, a sump, means to conduct the tailings from the separator to the sump, a scoop on the tube for transferring the material from the sump to one of said compartments, a second sump, means to conduct fines from the separator to the latter sump, and a scoop on the tube for transferring the fines from the fines receiving sump to the other compartment.

16. Apparatus for pulverizing material comprising, in combination, a mill having a rotary tube, preliminary, intermediate and finish grinding compartments therein, grinding elements in the compartments, a division head between the preliminary and intermediate compartments having provision for transferring material reduced in the former to the latter, the tube having a side opening therein for discharging material from the intermediate compartment, an air separator means to conduct the discharged material to the air separator, a sump for the intermediate compartment, a sump for the finish compartment, means to conduct tailings from the air separator to the intermediate compartment sump, means to conduct fines from the separator to the finish compartment sump, means to transfer tailings from the intermediate compartment sump into the intermediate compartment, and means to transfer fines from the finish compartment sump into the finish compartment.

17. Apparatus for pulverizing materials comprising, in combination, a mill having a rotary tube with at least two compartments therein and an opening in the tube located between the ends thereof, grinding elements in the compartments, an air separator for receiving material from one of said compartments and for separating the same into fines and tailings, means to conduct tailings from the separator to the mill and introduce the same through said opening into the tube into one of said compartments, and means to conduct fines to the other compartment.

18. Apparatus for pulverizing materials comprising, in combination, a mill having a rotary tube with compartments therein including preliminary and finish grinding compartments, said tube having openings therein communicating with said compartments and located between the ends of the tube, grinding elements in the compartments, an air separator for receiving material from one of said compartments and for separating the same into fines and tailings, means to conduct tailings from the separator to the mill and introduce the same through one of said openings into the preliminary grinding compartment, and means to conduct fines from the separator to the mill and introduce the same through the other opening into the finish grinding compartment.

19. Apparatus for pulverizing materials comprising, in combination, a mill having a rotary tube with compartments therein, grinding elements in the compartments, means for feeding material through one end of the tube into one of the compartments, an air separator for receiving material from one of said compartments and for separating the same into fines and tailings, means to conduct the tailings to the mill for further reduction, means to conduct the fines to the mill for final reduction, and means to deliver the finally reduced material through the end of the tube opposite to the feeding-in end thereof.

20. Apparatus for pulverizing materials comprising, in combination, a mill having a rotary tube, a plurality of compartments in the tube including a preliminary and a finish grinding compartment, grinding elements in the compartments, an air separator for receiving material from one of the compartments and for separating the same into fines and tailings, a sump, means to conduct the tailings from the separator to the sump, and means on the tube for transferring the tailings from the sump to the preliminary grinding compartment, and means to conduct fines from the separator into the finish grinding compartment.

21. Apparatus for pulverizing materials comprising, in combination, a mill having a rotary tube, a plurality of compartments in the tube including a finish grinding compartment, grinding elements in the compartments, an air separator for receiving material from one of the compartments and for separating the same into fines and tailings, a sump, means to conduct the fines from the separator to the sump, and means on the tube for transferring the fines from the sump to the finish grinding compartment for final reduction therein.

22. Apparatus or pulverizing materials comprising, in combination, a mill having a rotary tube with compartments therein, including a finishing compartment, grinding elements in said compartments, means in said tube for transferring material receiving preliminary reduction in one of said compartments, to another compartment for further reduction, an air separator, means to conduct material from the mill to the air separator, and means to conduct material separated by the separator simultaneously to said last named compartment and to said finishing compartment for further reduction therein.

In testimony whereof, the signature of the inventor is affixed hereto.

RAY C. NEWHOUSE.